(12) United States Patent
Wiker (10) Patent No.: US 6,655,373 B1
(45) Date of Patent: Dec. 2, 2003

(54) HIGH EFFICIENCY CONVEYOR OVEN

(75) Inventor: John Hammons Wiker, Plainfield, IL (US)

(73) Assignee: Middleby Marshall, Incorporated, Elgin, IL (US)

( * ) Notice: Subject to any disclaimer, the term of this patent is extended or adjusted under 35 U.S.C. 154(b) by 102 days.

(21) Appl. No.: 09/993,980

(22) Filed: Nov. 14, 2001

(51) Int. Cl.[7] .............................. A21B 1/08; F23H 7/18; F24J 3/00

(52) U.S. Cl. .................... 126/21 A; 126/21 R; 431/171; 432/225

(58) Field of Search .............................. 126/21 A, 21 R; 99/443 C, 447; 219/400; 431/171; 34/203; 432/225

(56) References Cited

U.S. PATENT DOCUMENTS

| | | | | |
|---|---|---|---|---|
| 4,753,215 A | * | 6/1988 | Kaminski et al. | 126/21 A |
| 5,277,105 A | * | 1/1994 | Bruno et al. | 99/443 C |
| 5,361,749 A | * | 11/1994 | Smith et al. | 126/21 A |
| 6,481,433 B1 | * | 11/2002 | Schjerven et al. | 126/21 A |

* cited by examiner

*Primary Examiner*—Alfred Basichas
(74) *Attorney, Agent, or Firm*—Michael Best & Friedrich LLC (57) ABSTRACT

A conveyor oven is heated by inshot burners, which eliminate blowers, ducts, and motors heretofore required to supply a force draft of combustion air to the burners. Apertures in front of the inshot burners have a diameter that regulates the amount of combustion air that is delivered to the burners. The only blower in the oven is the one required to circulate and recirculate hot air within the oven which produces three pressure zones that causes an induced draft of combustion air for the inshot burner. A modulating valve adjusts the flow of gas to the inshot burners.

16 Claims, 7 Drawing Sheets

HIGH EFFICIENCY CONVEYOR OVEN

This invention relates to conveyor ovens—especially, but not exclusively, to pizza ovens—and more particularly to ovens having high efficiency heat supplies.

BACKGROUND OF THE INVENTION

Conveyor ovens are well-known appliances for cooking or baking food products, especially pizzas, or the like. One example of such an oven is shown in U.S. Pat. No. 5,277,105.

Conventionally these ovens have large stainless steel housings with heated cavities in the form of tunnels extending through them. An endless conveyor extends through and out the opposite ends of the tunnel in order to transport food products through the heated cavity at a speed which cooks or bakes them during transit. Heretofore, the heat delivery system has included relatively expensive space-consuming motors, blowers, and ducts which supplied heat from a plenum through metal fingers and passageways which are also made of stainless steel. The metal fingers constitute air flow channels that deliver streams of hot air which impinge upon the surfaces of the food products on the conveyor. A control panel having microprocessors associated therewith enables the user to regulate the heat, speed of conveyor, etc. to select a temperature and transit time appropriate to the food product being transported through the oven.

The design, development and production of such conveyor ovens require a substantial capital investment. When there is an improvement of the oven which requires additional space in the housing, there is an advantage in making the existing parts smaller in order to obtain the additional space needed without requiring further significant capital investment resulting from redesign of the entire oven.

Another consideration in the design of conveyor ovens is the cost of energy. As the cost of energy increases, the efficiency of the heat delivery system raises to or near the top of the various considerations that go into the design of a conveyor oven. This means that a heating system for an oven which was acceptable when energy was less expensive may prove impractical, or at least undesirable, as the cost of energy goes up.

Yet another of the considerations which goes into the design of a conveyor oven is the simplicity of the design, the ease of control and maintenance, reliability and the like. Also, it is desirable to make such products with less-complicated components.

Still another consideration is the need to meet applicable government regulations and industry standards in the various locations where the oven is used and, more particularly, to universally meet as many of such regulations and standards as possible. For example, in the U.S., natural gas is a principal source of fuel for the conveyor oven. Other countries may rely primarily upon propane. In Europe, for example, mixtures of gases are often used, with different ratios of the gases in the mixture being used in different countries. Also, gas is a potentially hazardous substance; therefore, almost everywhere, the various governments have established their own safety regulations. Therefore, providing a universally usable oven design is highly desirable, but can be challenging.

SUMMARY OF THE INVENTION

Accordingly, an object of the invention is to provide a more compact, space-saving, and efficient heat delivery system for a conveyor-type oven. Another object is to provide an oven that is universally usable in many different locations throughout the world. Here, an object is to simplify controls, construction, and maintenance and to make a conveyor oven which is less complex. In this connection, an object is to accomplish these and other objects at reduced costs and improved efficiency.

In keeping with an aspect of the invention, these and other objects are accomplished by designing the heating system to eliminate the burner, blower and ducts used heretofore in a forced-draft system and to replace them with inshot burners that use an induced-draft system which does not require blowers specially dedicated to providing combustion air. The space saved by an elimination of such components makes for a more compact and efficient heat delivery system. With the present invention, the fan or blower used to circulate hot air within the oven is the only fan or blower that is required. A modulating gas valve is used to closely control the efficient flow of gas to the burner.

BRIEF DESCRIPTION OF THE DRAWINGS

The invention will be better understood from the following specification, taken with the attached drawings, in which.

DETAILED DESCRIPTION OF THE INVENTION

Figure 1:
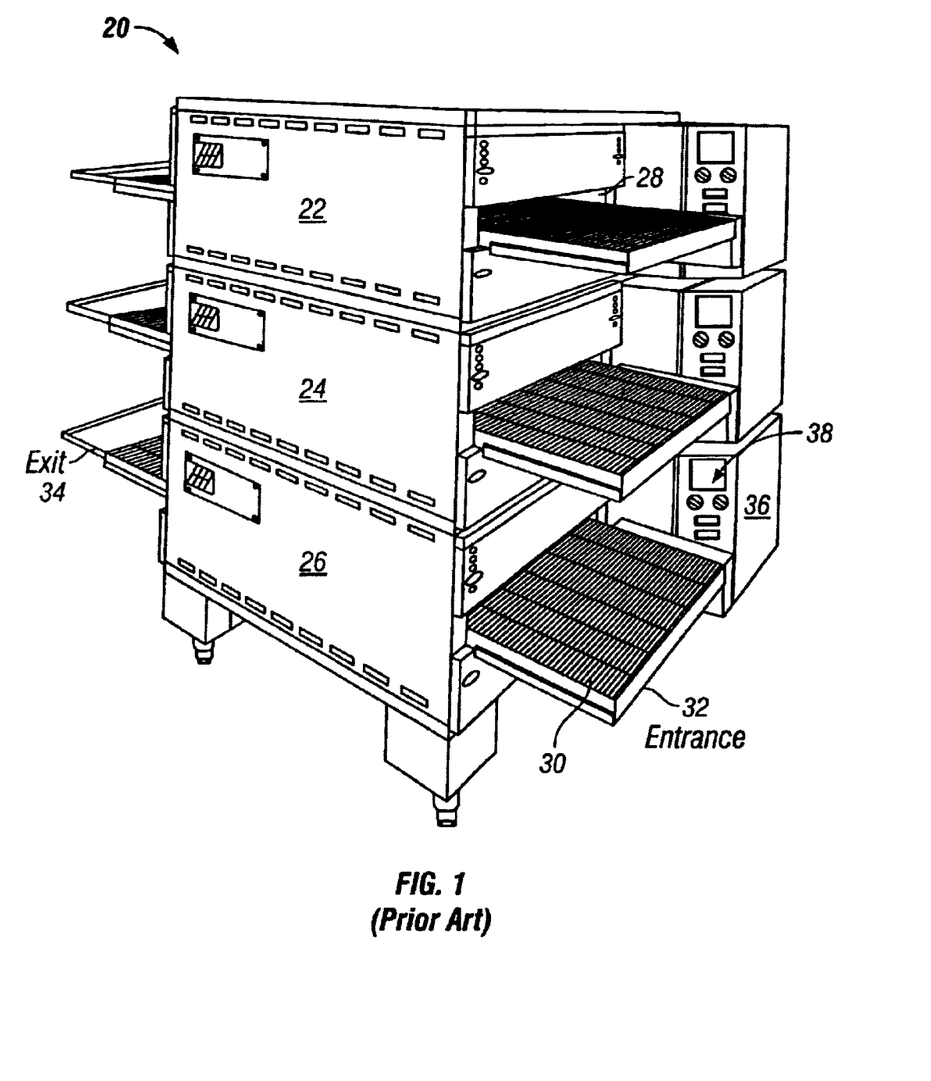
FIG. 1 is a perspective view of a stack of known conveyor ovens, here shown as an example of ovens which might use the invention.

FIG. 1 shows a stack 20 of three conveyor ovens 22, 24, 26. Each oven has a first section containing a cavity in the form of an open-ended tunnel, as shown at 28, extending therethrough. A draft of air is directed downwardly to "close" each of the open ends of the tunnel by deflecting currents of air within the oven which might otherwise carry heat away from the oven. An endless conveyor, such as 30, extends through each cavity or tunnel extending from entrance 32 to exit 34. A food product may be placed on the conveyor 30 at the entrance 32 of the oven. The conveyor moves the food product through the oven tunnel to exit 34 during a period of time calculated to cook or bake the food product while in transit. When it reaches the exit 34, the food product is removed from the conveyor and usually served to the customer.

A heat supply and delivery system is built into a housing, such as 36, in a second section of each oven 22, 24 and 26. Suitable controls 38 may be adjusted to control the temperature, conveyor speed, and the like. Among other things, these controls are used to adjust the heat delivery system, internal oven temperature and conveyor speed.

Figure 2:
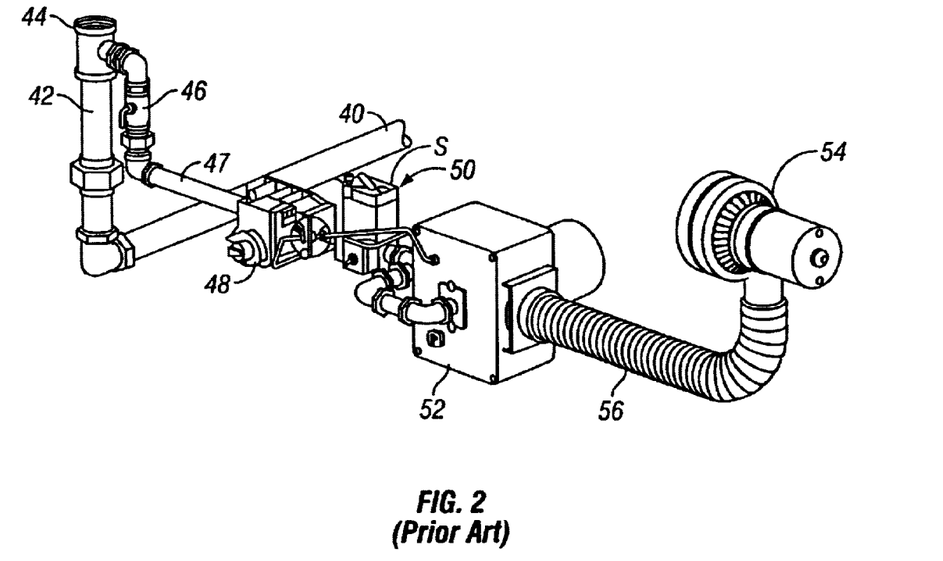
FIG. 2 schematically illustrates, in perspective, the prior art forced-draft burner system.

FIG. 2 shows an example of a conventional prior art forced-draft burner system which may be found in each housing 36 of the conveyor ovens illustrated in FIG. 1. A supply line 40 brings gas, such as natural gas, propane, or the like, from any suitable source. A vertical pipe 42 extends through each of the ovens 22, 24 and 26 in the stack. As here shown, pipe 42 supplies the gas for heating the lower oven 26. Similar pipes are attached, as at 44, to provide a series of pipes to carry the gas from supply pipe 40 upwardly to higher ovens in the FIG. 1 stack of ovens. In like manner, any suitable number of ovens may be supplied. At the top oven 22, the pipe is capped at the end corresponding to location 44.

A manual shut-off valve 46, which is simply an on/off switch for the flow of gas, connects pipe 47 to section 44. Pipe 47 leads to an automatic control valve 48, which is a safety device prescribed by governmental regulation. It automatically shuts off the gas supply under conditions that the government prescribes. For example, if the pressure of gas in line 40 should exceed a certain safe limit, valve 48 automatically shuts off the gas flow.

Item 50 is a suitable modulating valve for maintaining a finely-tuned control over the gas flow in order to maintain a stable temperature in the oven. Preferably, it is a modulating valve such as that shown in U.S. patent application Ser. No. 09/883786, filed Jun. 18, 2000, and entitled "Conveyor Oven with Automatically Modulated Gas Flow." One or more suitable sensors S in the oven cavity detect the temperature and adjust modulating valve 50 to switch the gas off or on as required.

Element 52 is a forced-draft gas burner which requires a substantial supply of combustion air. A blower 54 turns on and off in conjunction with the burner 52 to deliver a relatively large volume of combustion air via duct 56 to the burner. Since both the gas and combustion air are introduced directly into the burner 52, the heat supply and delivery system operates almost completely independent of what is happening in the oven, cavity or tunnel 28. The combination of burner 52, blower 54, and duct 56 requires a substantial amount of controls, control wiring and volume of space within the enclosure 36 of the oven. If these items are eliminated, a substantial amount of space can be saved to make the oven more compact or for adding newer and more modern equipment in the existing oven housing.

Figure 3:
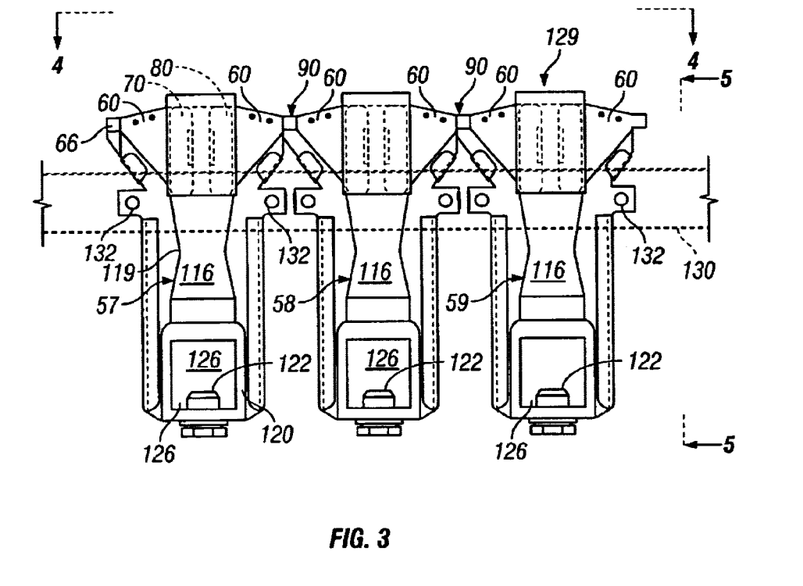
FIG. 3 is a plan view of three inshot burners.
Figure 4:
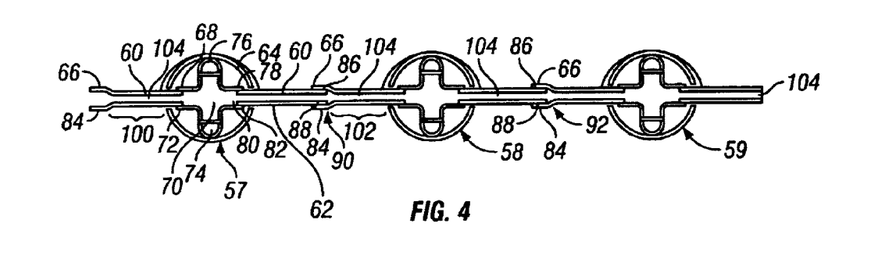
FIG. 4 is a front elevation of the inshot burners taken along line 4—4 of FIG. 3.
Figure 5:
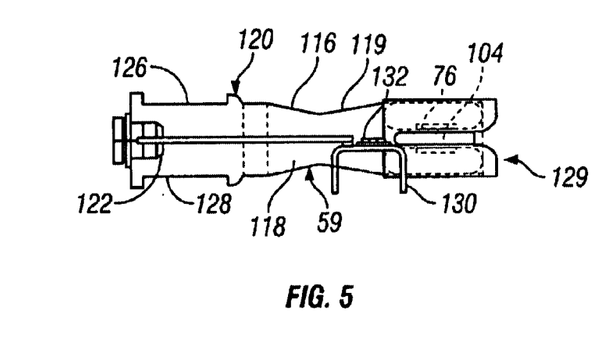
FIG. 5 is a side elevation of the inshot burner taken along line 5—5 of FIG. 3.

The instant invention eliminates the forced-draft system of FIG. 2 and uses an induced-draft system employing inshot burners shown in FIGS. 3–5, and in U.S. Pat. No. 5,361,749, granted Nov. 8, 1994 and entitled "Gas Fired Convection Oven," which is owned by the assignee of the present invention.

The inshot burners shown in FIGS. 3–5 are made of low cost sheet metal that does not discolor, warp, disintegrate or otherwise become damaged by intense heat. A number (here three for example) of inshot burners 57, 58, 59 (FIG. 3) are mounted horizontally in a row in order to project a plurality of horizontal flames and thereby supply heat into a plenum in housing 36 (FIG. 1).

Each inshot burner 57–59 (FIG. 4) is made from two mirror image stamped metal plates 60, 62 surrounded by a somewhat cylindrical member 64. One of the stamped metal plates 60 begins with a step 66, followed by a substantially flat member and then half 68 of a horizontal flame-shaping channel 70. Section 72 formed on plate 62 is shaped complementary to half 68 to form; horizontal flame-shaping channel 70. Thereafter, plate 60 has a vertical flame-shaping channel 76, followed by a second half 78 of horizontal flame-shaping channel 80. Section 82 formed on plate 62 is shaped complementary to half 78 to form flame-shaping channel 80. Between sections 72 and 82, plate 62 has a vertical flame-shaping channel 74. Thus, there are four substantially U-shaped channels 70, 74, 76, 80, which together shape the flame in a known manner. Substantially flat members 86 and 88, formed on plates 60 and 62, respectively, extend from sections 78 and 82, respectively, to form tab-like sections.

The two steps 66, 84 of one burner form the open arms of a U-shaped member for receiving a tab formed by the two flat face-to-face ends 86, 88 on an adjoining burner. Thus, the interlocking feature of tabs 86, 88 and U-shaped members 66, 84 enable the inshot burner modules 57–59 to snap together, as shown at 90. Therefore, the three inshot burner modules 57–59 are here joined at 90, 92 by slipping the tabs 86, 88 on one end of wing-like plates into the U shaped member 66, 84 on the opposite end of the adjoining plates. In the flat areas such as 100, 102, the two plates 60, 62 are separated by a narrow space 104 which provides a continuous gas carryover channel for conveying a lighting gas to adjacent burners if they should not then be burning.

The somewhat cylindrical shroud 116, 118 (FIGS. 3, 5) is given a shaped waist 119 of reduced cross section which forms a venturi that enhances the burner efficiency. A hood 120 is placed on the end of the cylindrical shrouds 116, 118 to receive gas at orifice 122 from a manifold (seen at 180 in FIG. 7) carrying pressurized gas supplied via pipe 47 (FIGS. 2, 6, 7, 8). Orifice 122 emits a jet of gas into an area having upper and lower windows 126, 128 (FIG. 5) for drawing in combustion air. The gas is projected through orifice 122 under the pressure in the gas line 47, past windows 126, 128, and through the venturi formed by waist 119 at the center of the cylindrical shroud. The high velocity of the pressurized gas jet and an air pressure differential in the area pulls in the combustion air (via windows 126, 128), which mixes homogeneously with the gas, as they pass through reduced cross section waist 119. At the far end of the waist, the projected gas-air mixture reaches the flame shaping members 70, 74, 76, 80. Ignition occurs at the front 129 of the burner.

The three inshot burner modules 57–59 are mounted on and fastened to a channel support 130 by any suitable fasteners, such as screws 132.

Figure 6:
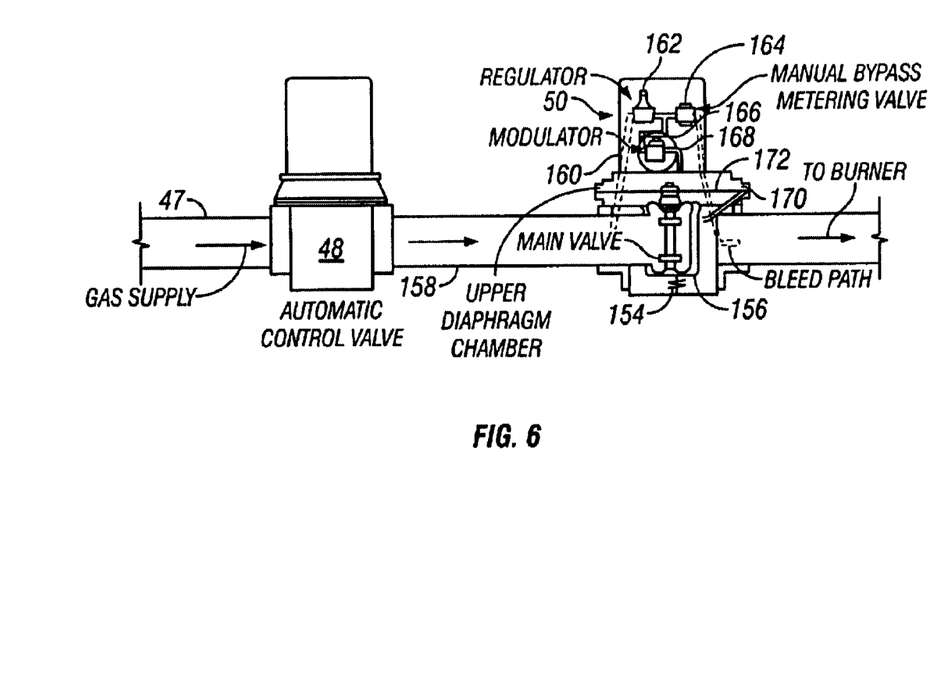
FIG. 6 is a schematic representation of a modulating gas supply value.

A modulating gas flow control valve 50 is shown in cross section (FIG. 6). A spring 154 biases a main valve 156 into a closed position. The valve 156 is modulated against the spring bias, causing it to move toward either closed or opened positions in order to control or regulate the amount of gas flowing from line 47 to the inshot burners. A by-pass line 160 enables gas to flow around the main valve 156 and through a pressure regulator 162 even when valve 156 is closed, thereby continuously maintaining at least a minimum level of burner pilot operation. A manual valve 164 in the by-pass line may cut-off or allow the by-pass gas to flow, as a safety or shut down procedure.

Midway between regulator 162 and the manual by-pass valve 164, a tap line 166 allows the by-pass gas to flow through modulator 168, which modulator controls the amount of gas that flows from pipe 47 into an upper chamber 170 which is closed by a diaphragm 172. Modulator 168 is controlled responsive to signals from thermocouple sensors S (FIG. 7) in the oven. The gas pressure in chamber 170 is such that, as the oven becomes cooler, the diaphragm moves down, and as it becomes hotter, the diaphragm moves up. Hence, the diaphragm 172 moves up or down as a function of the instantaneous oven temperature, and that movement is passed on to valve 156 which reduces or increases the flow of gas to the burner.

In operation, as the sensed oven temperature goes down, the modulator 168 allows more gas to flow from the by-pass and tap lines 160 and 166 into upper chamber 170, thereby increasing the pressure in chamber 170 and deflecting the diaphragm 172 to push valve 156 against the bias of spring 154 by a discrete distance toward an open position. If the sensed oven temperature goes up, modulator 168 restricts the flow of by-pass gas, the pressure in upper chamber 170 reduces, the diaphragm 172 returns somewhat from its deflected condition, and spring 154 pushes the valve 156 to a closed or more closed position.

When there is a need for a low level of heat, there is little or no pressure on the diaphragm 172 and gas flows only through by-pass line 166 and at a very low rate. In between the demands for a high level of heat and a low level of heat, the pressure in the upper chamber 170 has an intermediate effect upon the deflection of diaphragm 172 and, therefore, on the position of main valve 156 to regulate the amount of gas flowing to the burner. Hence, the amount of gas delivered to the inshot burner is modulated to closely follow the instantaneous fluctuations of the oven temperature.

Figure 7:
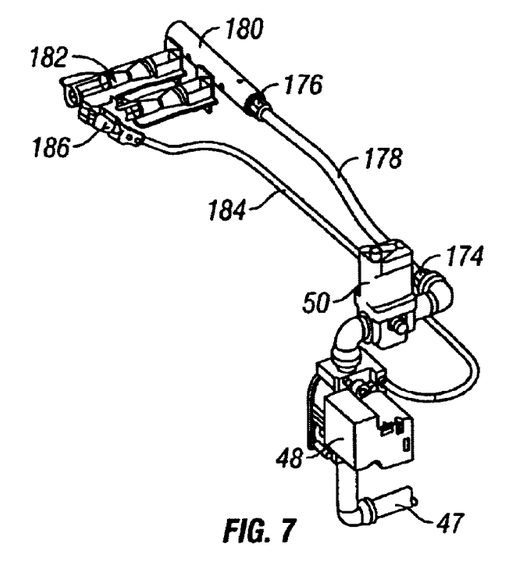
FIG. 7 schematically illustrates, in perspective, the efficient inventive induced-draft heat supply system which replaces the system of FIG. 2.

The assembly of the inventive heat supply and delivery system is shown in FIG. 7, which may be compared with the prior art heat supply system in FIG. 2 in order to see the space savings and the simplicity of the invention.

The gas supply line 40 (FIG. 2) is extended via pipe 47 (FIGS. 7, 8) through the safety cut off gas control valve 48 to the modulating gas valve 50. Fittings 174,176 connect a large diameter (½ inch) gas delivery, pipe 178 between the modulating gas control valve 50 and a manifold 180 that feeds any suitable number of inshot burners 182 (here two burners).

A second and smaller diameter pipe 184 (¼ inch) conducts gas to support a suitable pilot flame or to an igniter 186 (FIG. 2). The inshot burners 182 ignite and supply heat as the modulating gas control valve 50 responds to a suitable number of thermocouple sensors S in the conveyor oven cavity or tunnel 28.

Figure 8:
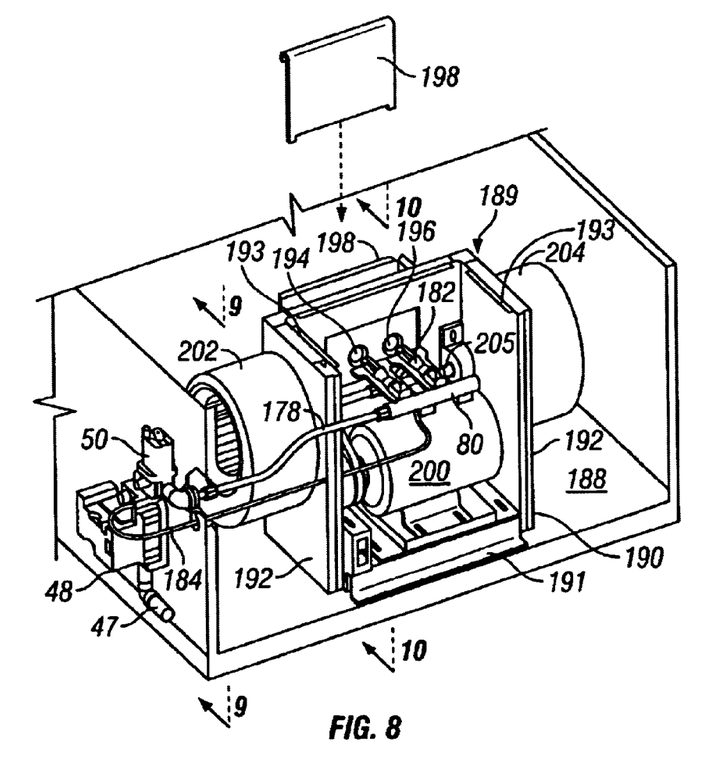
FIG. 8 is a perspective view showing an adjunct part of the heat supply system of FIG. 7 in connection with an oven blower, for driving hot air through a conveyor oven, such as that shown in FIG. 1 for example.

FIG. 8 shows part of the inventive induced-draft heat supply system for a conveyor oven. Compartment 188 is a separate blower housing which is an adjunct to the plenum 240 shown in FIG. 10. Inside compartment 188, section 189 includes an insulated housing 192, here shown with its back plate 238 removed in order to reveal the inner construction. During operation, the back plate (shown at 238 in FIG. 9) is received in side channels 190 and attached by screws at preformed screw holes 191. The back plate is perforated to enable fresh air to enter burner housing 189. The safety gas control valve 48 and the modulating gas valve 50 are mounted outside the blower housing 188. Suitable walls of insulated housing 192 support the inshot burners 182 which are positioned adjacent flame apertures 194, 196 so that the burners 182 will project their flames through the apertures upon target plate 198. The target plate 198 is removably positioned a selected distance in front of the flame apertures 194, 196 in order to limit the distance which the flame may project from inshot burners 182 into the area 188. This target plate 198 is preferably 10-gage, type 304, stainless steel.

Inside the insulated burner housing 192, an electric motor 200 is coupled to operate two blowers 202, 204 mounted on opposite ends of a single rotatable shaft 205. These blowers drive the hot air from the plenum. 240, through the oven, and back to the plenum. Regardless of the form of the heat supply system, the motor 200 and blowers 202, 204 are required to circulate the hot air in:order to cook or bake the food product on the conveyor.

Figure 9:
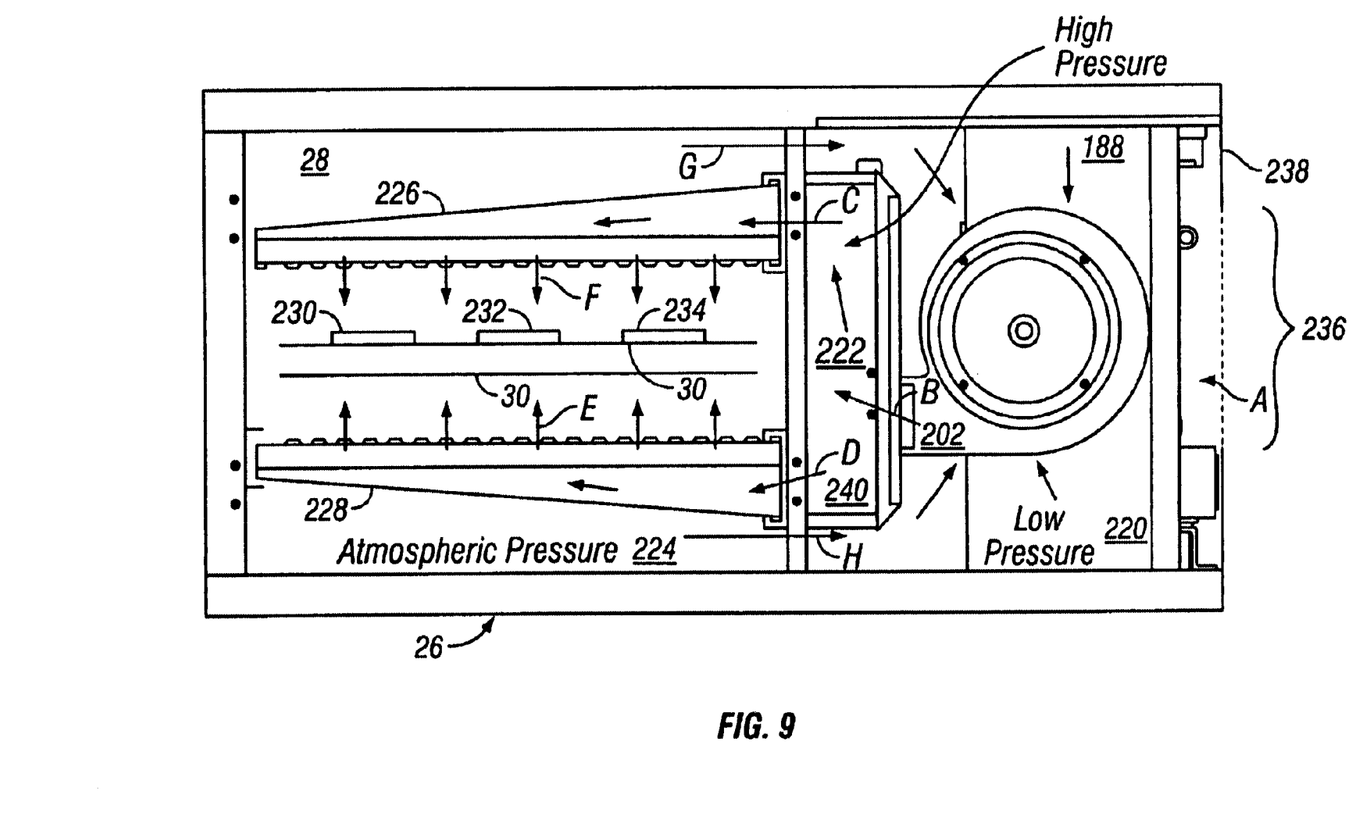
FIG. 9 is a schematic and cross-sectional side view of an oven taken in part along line 9—9 of FIG. 8 and showing a hot air path forming a heat delivery system extending through the oven.
Figure 10:
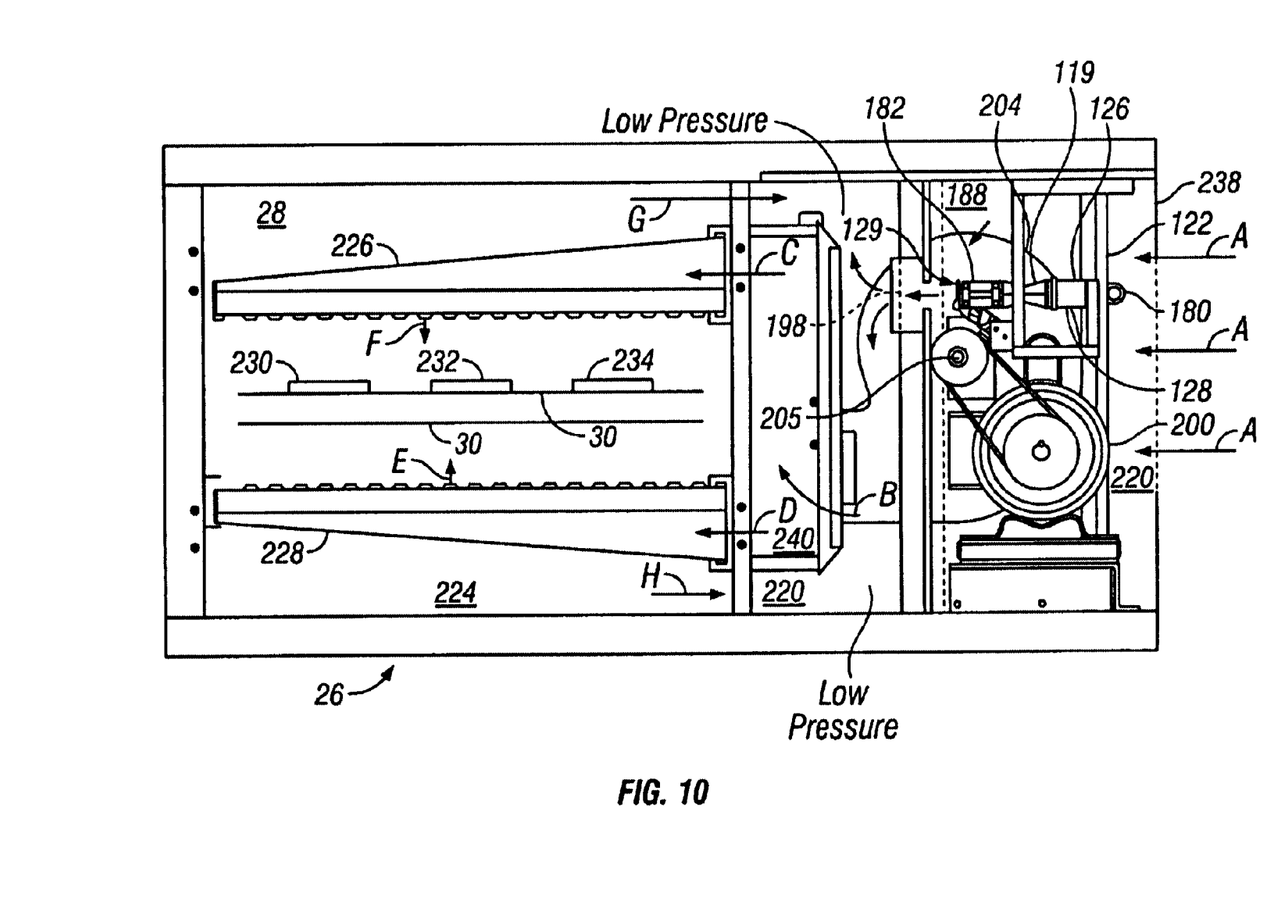
FIG. 10 is a cross-sectional view taken along line 10—10 of FIG. 8, where the inshot burners are located.

Since the induced-draft system of FIGS. 7 and 8 has no independent blower 54 as in the prior art forced-draft burner such as shown in FIG. 2 for supplying combustion air, it relies on the pressure differential shown in FIGS. 9, 10 for drawing in combustion air. More particularly, oven 26 (FIG. 1) has three internal pressure zones: a low pressure zone 220 in the adjunct blower section 188, a high pressure zone 222 in the plenum 240, and an atmospheric pressure zone 224 in the oven cavity or tunnel 28. The oven cavity or tunnel 28 includes upper and lower fingers 226 and 228 which form channels to deliver streams of hot air onto the: surfaces of the food products 230–234 being carried by conveyor 30.

In the adjunct section 188, blowers 202, 204 pull fresh air (Arrow A) from outside the oven through a perforated section 236 of back plate 238. In one embodiment, these perforations provide about 50 square inches of open space. After the intake air is heated in adjunct section 188 by the inshot burners 182, the blowers 202, 204 force the hot air (Arrow B) from adjunct section 188 into the plenum 240, thereby reducing the air pressure in adjunct section 188 to a low pressure 220 and increasing the air pressure in plenum 240 to a high pressure 222.

The high pressure in plenum 240 causes the hot air (Arrows C, D) to move through fingers 226, 228 onto the food products 230–234 (Arrows E, F), and return (Arrows G, H) to the plenum 240.

The resulting induced-draft of air (Arrow A) provides combustion air for inshot burners 182 (FIG. 10). The combustion air enters the windows 126, 128 of the burner and carries the gas entering jet 122 to the front 129 of the burner where it ignites. On the way, the gas and combustion air mix homogeneously in venturi or waist area 119. The pressure differentials within the oven 26 amount to several tenths of an inch, as measured by the weight of water in a water column. A differential in the range of 2 to 3 tenths of an inch provides enough suction to draw combustion air from the outside through windows 126, 128 of the inshot burners 182 which induces a draft of air to forcibly drive the gas flowing through orifice 122 (FIG. 3) into and through the venturi 119 of the burner. That draft provides about 30% of the necessary combustion air.

Ignition starts at the face 129 of the burner, which is preferably located in the low-pressure zone 220 about one inch from the flame apertures 194, 196 (FIG. 8). The suction resulting from the differential between low pressure zone 220 and the high pressure zone 222 acting through apertures 194, 196 pulls the flame through the aperture along with a sufficient amount of air to complete the combustion. The flames projecting through apertures 194, 196 impinge on target plate 198.

The diameters of apertures 194, 196 and the distance between the apertures and target plate 198 are factors to be considered in the design of the induced-draft system to achieve efficient heating for the oven. However, random variables including, for example, the geographic locale in which the oven is used will also affect the efficiency of the oven. Some places use natural gas while others use propane or mixtures of different gases. Different geographic locales have their own regulations and standards for use of the gas that fuels the ovens. Each of these and other considerations has an effect upon the design of the apertures and the location of the target plate to produce the most efficient heating system.

For natural gas delivered at 1,000 BTU per cubic foot or 25,000 BTU per hour and for liquid propane delivered at 22,500 BTU per hour, the preferred diameter of the flame apertures 194, 196 is 1.0620 inches (2.697 cm.), although a reasonable range of diameters in the order 0.75–1.5-inches (1.9–3.8 cm.) may be used.

This same preferred diameter was also tested and found proper for the following types of gas:

| Type | Component | |
|------|-----------|------|
| G20  | Methane   | 100% |
| G25  | Methane   | 86%  |
|      | Nitrogen  | 14%  |
| G30  | N-Butane  | 50%  |
|      | Isobutane | 50%  |
| G31  | Propylene | 100% |
| G110 | Methane   | 26%  |
|      | Hydrogen  | 50%  |
|      | Nitrogen  | 24%  |

Based upon the tests with these types of gas, it is thought that the inventive burner system with the 1.0620-inch diameter flame aperture will have utility with most commonly available types of gas that may be used in the conveyor oven.

Accordingly, the oven has a number of slots for receiving target plate 198 at different distances from apertures 194, 196 to adjust the efficiency of the burner. The person who installs the oven selects a slot for receiving target plate 198 based upon his knowledge of the gas used locally, the local requirements, and other variables. Usually, an experienced installer will initially make the correct selection of a slot for receiving the target plate. However, if the burner does not appear to be operating as efficiently as it should, the installer can adjust the position of the target plate by placing it in another slot. Thus, the selection of the target plate location is one of experience, empirical studies, and trial and error.

The design of the induced-draft air flow heating system involves the following factors:

(1) The draft created by the pressure differential between the adjunct blower compartment 188 and the plenum 200 varies with oven temperature and the arrangement of fingers 226 and 229. As oven temperature increases, the density of the of air reduces which, in turn, reduces the efficiency of the blower. A removal or addition of fingers decreases or increases the restriction on the flow and return of air.

(2) The size of the flame apertures 194, 196 is calculated on a basis of the cleanliness of the combustion to minimize the generation of soot. Also, the calculation of aperture size is based on the ratio of carbon to carbon dioxide at the output end of the burning process. A theoretically perfect combustion produces 12% carbon dioxide, 80% nitrogen, and the rest carbon. The amount of carbon dioxide depends primarily upon the dilution of the gas fuel by the amount of combustion air mixed therewith.

The lower limit on the diameter of the flame apertures 194, 196 is dictated by the need for a sufficient amount of combustion air under the most reduced draft conditions, which occur at the lowest reasonably anticipated pressure differential which in turn depends primarily on the oven/finger configuration. The upper limit on the diameter of the apertures is selected to prevent an excessive amount of combustion air under the most increased and reasonably anticipated gas flow conditions. Consideration is given to the marginal operation of the modulating valve 50 and to the effects produced in venturi 119 under reduced gas flow conditions because the lower gas injection pressure pulls in less combustion air.

Other less critical factors are the:

(3) distance between burner face 129 and apertures 194, 196;

(4) distance between apertures 194, 196 and target plate 198;

(5) alignment of the components; and (6) amount and type of gas that is used to fuel the burner.

The heat supplied by the inshot burners of the present invention provides a simpler, less expensive system with less complex controls than the prior art forced-draft burner of FIG. 1. Also, it tends to hold the heat at a more stable temperature since there is a modulation of the heat supply and less need for the heat supply to hunt between high and low limits as it does when the heat delivery system switches off and on.

Those who are skilled in the art will readily perceive various modifications which may be made. Therefore, the invention is to be construed to cover all structures which may fall within the scope and spirit of the invention.

The claimed invention is:

1. A conveyor oven comprising:
   a heated chamber having a conveyor for transporting food products therethrough;
   a heat source having a gas fired burner for heating the chamber, the burner being situated to receive air from the ambient atmosphere via a flow path that includes no pressure generating equipment; and
   a heat delivery system for delivering heat from the heat source to the chamber, the heat delivery system having a blower for both inducing a draft of combustion air through the burner and circulating the air heated by the burner through the chamber, the blower communicating with the burner and the heated chamber via a combined flow path that is situated to receive a mixture of fluid from the burner and fluid from the heated chamber.

2. The oven of claim 1 wherein the heat source is disposed in a zone at a pressure which is less than the ambient pressure of the oven when the blower is in operation.

3. The oven of claim 2 further comprising a plenum disposed between and in communication with the heat source and the chamber.

4. The oven of claim 1 further comprising a target plate spaced in front of the burner to limit the length of the burner flame.

5. The oven of claim 4 wherein the spacing of the target plate in front of the burner can be adjusted.

6. The oven of claim 4 further comprising a burner housing having a flame aperture in front of the burner for passing a flame from the burner.

7. The oven of claim 6 wherein the size of the flame aperture is dimensioned in response to oven operating conditions.

8. The oven of claim 4 wherein the distance the target plate is spaced in front of the burner is in response to oven operating conditions.

9. A conveyor oven comprising:
a first zone having a burner for heating the oven, the burner being situated to receive air from the ambient atmosphere via a flow path that includes no pressure generating equipment;
a second zone having a plenum adjacent to and in communication with the first zone;
a third zone adjacent to and in communication with the plenum, the third zone having a heated chamber with a conveyor for transporting food therethrough; and
a blower disposed in the first zone for creating a pressure differential between the first zone, the plenum and the ambient pressure of the oven to induce a draft of combustion air through the burner and circulate the air heated by the burner through the plenum and chamber, the blower communicating with the burner and the heated chamber via a combined flow path that is situated to receive a mixture of fluid from the burner and from the heated chamber.

10. The oven of claim 9 wherein the burner further comprises an inshot burner.

11. The oven of claim 10 further comprising:
a burner housing having a flame aperture in front of the burner for passing a flame from the burner; and
a target plate spaced in front of the flame aperture to limit the length of the flame outside of the burner housing.

12. The oven of claim 11 wherein the flame aperture has a diameter in the range of 0.75 to 1.5 inches.

13. The oven of claim 11 wherein the flame aperture has a 1.0620-inch diameter.

14. The oven of claim 11 wherein the blower is located outside the burner housing.

15. The oven of claim 9 further comprising:
a sensor for detecting the instantaneous temperature in the chamber; and
a modulating valve for regulating a flow of gas to the burner in response to the sensor.

16. The oven of claim 11 wherein the inshot burner comprises:
a coupling for connecting the burner to a source of gas, the coupling having a gas jet aperture through which a high velocity gas jet is projected;
a window in the burner adjacent to the gas jet aperture for the entry of combustion air; and
a reduced diameter section downstream from; the window for mixing and accelerating the gas and combustion air within the burner.

* * * * *